(12) United States Patent
Schulze (10) Patent No.: US 10,826,359 B2
(45) Date of Patent: Nov. 3, 2020

(54) TWO-POLE BRUSH-COMMUTATED DC ELECTRIC MOTOR

(71) Applicant: Lakeview Innovation Ltd., Buochs (CH)

(72) Inventor: Jens Schulze, Giswil (CH)

(73) Assignee: LAKEVIEW INNOVATION LTD., Buochs (CH)

( * ) Notice: Subject to any disclaimer, the term of this patent is extended or adjusted under 35 U.S.C. 154(b) by 683 days.

(21) Appl. No.: 15/354,666

(22) Filed: Nov. 17, 2016

(65) Prior Publication Data

US 2017/0149313 A1 May 25, 2017

(30) Foreign Application Priority Data

Nov. 19, 2015 (EP) .................................... 15003305

(51) Int. Cl.
*H02K 13/00* (2006.01)
*H02K 23/30* (2006.01)
(Continued)

(52) U.S. Cl.
CPC ............. *H02K 13/006* (2013.01); *H02K 3/12* (2013.01); *H02K 3/28* (2013.01); *H02K 13/10* (2013.01);
(Continued)

(58) Field of Classification Search
CPC ...... H02K 13/006; H02K 13/04; H02K 13/10; H02K 3/12; H02K 3/28; H02K 23/30; H02K 23/58
See application file for complete search history.

(56) References Cited

U.S. PATENT DOCUMENTS 4,219,753 A * 8/1980 Heyraud .................. H02K 3/04
310/198
4,618,794 A 10/1986 Rampignon
(Continued)

FOREIGN PATENT DOCUMENTS

EP 2 104 205 A1 9/2009
JP 2014193069 A 10/2014

OTHER PUBLICATIONS

Office Action dated Jan. 12, 2017, by the Japanese Patent Office in corresponding Japanese Patent Application No. 16195930.9. (7 pages).
(Continued)

*Primary Examiner* — Jue Zhang
(74) *Attorney, Agent, or Firm* — Buchanan Ingersoll & Rooney PC (57) ABSTRACT

A two-pole brush-commutated DC electric motor with a stator and a rotor with a hollow-cylindrical ironless winding having n coil segments and a commutator having n commutator segments. Each coil segment being electrically connected to two adjacent commutator segments. An axis of gravity intersects the rotor axis perpendicularly and passes through the center of gravity of a coil segment or a center line of the coil segment that passes through the center of gravity and the rotor axis spanning a coil plane that defines the angular position of the associated coil segment. Two brush contact surfaces of the commutator segments are electrically connected to this coil segment have a distance bisector intersecting the rotor axis perpendicularly. The distance bisector and the rotor axis span a commutator plane which defines the angular position of the associated commutator segments.

15 Claims, 7 Drawing Sheets

(51) Int. Cl.
*H02K 13/10* (2006.01)
*H02K 23/58* (2006.01)
*H02K 3/12* (2006.01)
*H02K 3/28* (2006.01)
*H02K 13/04* (2006.01)

(52) U.S. Cl.
CPC ............ *H02K 23/30* (2013.01); *H02K 23/58* (2013.01); *H02K 13/04* (2013.01)

(56) References Cited

U.S. PATENT DOCUMENTS

| | | | |
|---|---|---|---|
| 9,564,783 B2* | 2/2017 | Teimel | H02K 1/30 |
| 9,685,830 B2* | 6/2017 | Kasper | H02K 21/14 |
| 2009/0091211 A1* | 4/2009 | Huan | H02K 23/30 |
| | | | 310/265 |
| 2009/0134736 A1 | 5/2009 | Yamamoto et al. | |
| 2010/0052440 A1* | 3/2010 | Shioda | H02K 5/148 |
| | | | 310/51 |
| 2014/0139054 A1* | 5/2014 | Freakes | H02K 5/146 |
| | | | 310/47 |

OTHER PUBLICATIONS

European Search Report dated Mar. 29, 2016, by the European Patent Office as the International Searching Authority for International Application No. EP 15003305.8.

\* cited by examiner

TWO-POLE BRUSH-COMMUTATED DC ELECTRIC MOTOR

The present invention relates to a two-pole brush-commutated DC electric motor with a stator and a rotor provided with a hollow-cylindrical ironless winding having n coil segments (coils) and with a commutator having n commutator segments, each coil segment being electrically connected to two adjacent commutator segments, an axis of gravity that intersects the rotor axis perpendicularly and passes through the center of gravity of a coil segment, or a center line of the coil segment that passes through the center of gravity, and the rotor axis spanning a coil plane that defines the angular position of the associated coil segment, two brush contact surfaces of the commutator segments that are electrically connected to the same coil segment have a distance to each other with a distance bisector intersecting the rotor axis perpendicularly, the distance bisector and the rotor axis spanning a commutator plane which defines the angular position of the associated commutator segments, and where n is a whole natural number.

Such a DC electric motor is known e.g. from DE 102010049524 A1. This is a motor with a rotor system having a hollow-cylindrical ironless winding in which the individual coil segments run obliquely to the axial direction of the hollow cylinder and are for commutation connected to the associated commutator segments. For this purpose, the winding taps, which exit at the front face side of the winding, are radially bent and led inwardly in a star-shaped manner where they are then electrically connected to the associated commutator segment. The cylindrical commutator formed by the plurality of commutator segments being electrically insulated from each other is in sliding contact with two brushes disposed diametrically opposite. The brushes comprise a spring device with which they are pressed against the commutator, so that a brush contact force acting perpendicularly to the surface of the jacket surface arises. In DC motors, the current of a coil segment is during commutation first stopped by short-circuiting the latter by way of the brush and subsequently again built up with a reversed polarity sign. Chorded or slanted windings are commonly used in such two-pole DC motors. Examples of usable ironless windings which have a winding wire path that runs obliquely to the axial direction are described in 1188709 B, DE 1463855 A1, DE 1538843 A1, DE 1613168 A1, DE 102005051059 A1, EP 2180581 A2, EP 1073179 A2, and DE 102014102204 A1. It is evident therefrom that a polygonal or rhombic shape of the coil segments is preferred. Each coil segment is composed of a certain number of windings and therefore represents a curved three-dimensional structure which rotates about the rotor axis. In the predominant cases of ironless windings, the winding taps, which are connected to the commutator segments, are located radially outside the associated commutator segment. They can then be electrically connected to one another by way of a relatively short conductor. For reasons of space, it can with particularly small special shapes also be advantageous to connect them obliquely at an angle of 45°. One such embodiment is described in JP 2002-64966 A.

A small electric motor is known from EP 2104205 A1 with a rotor comprising a laminated core in which vibration-reduced running against a stopper is to be achieved by way of a rotation of the brush plane relative to the magnetic plane. In order to compensate for the rotation of the brushes relative to the magnets, also the commutator is respectively rotated back relative to the windings.

The stator of a two-pole brush-commutated DC electric motor can have a cylindrical permanent magnet inserted into the interior of the hollow-cylindrical ironless winding. Disposed on the outside is then a magnetically conductive yoke sleeve.

Such electric motors have no detent torque due to the ironless rotor, so that running it without jolting is also possible at small rotational speeds, which in general leads to less vibration and noise. As a result, any desired rotor position can be easily controlled and no non-linearity in the control action is given. Due to the lack of iron in the rotor, there is consequently no loss of iron and constant magnetization takes place. This leads to a high degree of efficiency (of more than 90%) and a low no-load current (typically <50 mA). Saturation effects in an iron core are accordingly avoided. In addition, the torque generated remains strictly proportional to the motor current even at the highest currents. The power of the motors depends on the strength of the permanent magnet used. The small mass inertia of the rotor is also advantageous and leads to high dynamics and small run-up times. Although these motors are widely used and generally have good operating behavior, it has been found in practice that vibrations occur at times in the region of the commutator, whereby the current is modulated which subsequently leads to amplification of the vibrations due to this feedback.

It is therefore the object of the present invention to provide a two-pole brush-commutated DC electric motor of the type initially mentioned which exhibits reduced current modulation due to improved vibration behavior.

For this purpose, it is provided for a generic two-pole brush-commutated DC electric motor of the type mentioned at the outset, that the coil plane of a coil segment (coil) is arranged rotated by a correction angle ($\alpha$) in the angular range of >45° to <135° about the rotor axis relative to the commutator plane of the associated commutator segment.

The inventors have—in particular with coil segments which extend obliquely relative to the axial direction of the hollow cylinder—recognized that a diametrically resulting force or a torque extending transversely to the axis of rotation (depending on the type of winding) is associated with the current. Both effects can deflect the rotor in the radial direction at the location of the commutator. If this lateral motion of the commutator has a component in the direction of the brushes, then the brush contact pressure and thus the current are modulated. It is with the invention therefore attempted to advantageously reduce or suppress this force influence or torque influence, respectively. It would of course be most advantageous if the direction of the forces and torques occurring due to currents in the commutated winding segment (i.e. the coil segment) act substantially perpendicular to the direction of the brush contact, so that feedback via the brush contact is avoided. However, an advantage already arises when the feedback via the brush contact is reduced over known embodiments. The direction of the acting force can be changed by the correction angle between the coil plane and the commutator plane so that the influence on the brushes in the direction of the brush contact is reduced or suppressed. Since the winding or the individual coil segments are difficult to describe in terms of their shape diversity and their three-dimensional arrangement, the center of gravity of a coil segment is in the present case geared towards. Also the resulting force of this coil segment is in most cases to be related to this center of gravity or the resulting moment act about the latter, respectively. The axis of gravity, which is perpendicular to the rotor axis together with the rotor axis then generally spans a coil plane which in most cases divides the coil segment into two symmetrical halves. A coil plane can thus be determined for each of the coil segments which is then respectively arranged rotated about the rotor axis by a certain angular amount relative to the coil plane of the adjacent coil segment.

The rotational angle positions of the commutator segments are in the same manner defined by the commutator plane. Two adjacent commutator segments each define a commutator plane which is spanned therebetween. This commutator plane generally also divides the contact surface of the associated brush into two halves when the brush is in symmetrical contact with the brush contact surfaces of the two adjacent commutator segments. As compared to conventional configurations, the winding is quasi arranged rotated relative to the commutator about a predetermined correction angle. The brushes respectively follow this rotation.

It has been found that the invention is particularly advantageous when used with a winding according to DE 1538843 A1, DE 1463855 A1, DE 102005051059 A1, EP 2180581 A2 and DE 102014102204 A1, because it leads to reduction of vibration of the rotor system.

The advantages of the present invention are already very noticeable when the correction angle is according to one embodiment in an angular range of 60° to 120°, preferably 75° to 105°. Of particular advantage is of course one embodiment in which the correction angle is substantially 90°. In most types of windings, the resulting forces thereby act substantially tangentially to the commutator and thus perpendicular to the brush contact, whereby displacement of the commutator in the direction of the breasts [sic] is minimized.

The present invention is of particular advantage for a rotor having a hollow-cylindrical ironless winding because these rotors have a low rotational mass due to the lack of iron. However, they can therefore also be more easily deflected radially by transverse forces. The design of the bearings of course also has a certain influence in terms of this radial deflection.

Transverse forces occur in particular when the individual coil segments of the winding according to one embodiment run at least to a large extent obliquely relative to the rotor axis. This is in particular the case with polygonal and rhombic-shaped arrangements of coil segments. The advantages of the invention are there particularly noticeable. According to one variant, the individual turns of the coil segments therefore in the development of the winding each have a rhombic shape, the front and rear tip (which can be rounded) of which can be located on the face sides of the winding. Development presently denotes the flat, i.e. the strip-shaped arrangement of the winding, where the length of this developed winding corresponds to the circumference of the hollow-cylindrical ironless winding.

Preferably, a first turn of the coil segment and a last turn of the coil segment can each be provided with a winding tap which is electrically connected to the respectively associated commutator segment. The first turn and the last turn are presently the real turns that are involved in the commutation and no false turns, so that the active coil segment is referred to. A coil segment is therefore electrically connected to two adjacent commutator segments, so that a brush bridging these two commutator segments short-circuits this coil segment.

In order to provide the shortest possible connection paths between the coil segments and the commutator segments, the winding taps are preferably arranged on that face side of the winding that is closest to the commutator.

It is in an advantageous embodiment provided that the winding tap is led obliquely out from the winding in order to bridge the correction angle. In this way, relatively short connecting paths are still maintained despite the correction angle.

Furthermore, it can be provided that the winding tap and the associated commutator segment are connected by use of a conductor which is formed from the winding wire or which is part of the commutator or which is formed by a PCB circuit. The most favorable connection technique can there be used depending on the design of the motor and with regards to costs. There is also the option of inserting further circuits which further improve commutation (for example, a CLL plate).

The two-pole system can be easily created in particular where the stator comprises a permanent magnet with a main magnetization direction, and the commutator comprises two diametrically arranged commutator brushes, the common axis of which is substantially oriented rotated (about the rotor axis A) by the correction angle, preferably perpendicular relative to the main magnetization direction. This arrangement already takes into account the correction angle of the winding, whereby this arrangement is already unusual and entails the respective advantages. However, advantages are already obtained where rotation of the common axis of the commutator brushes relative to the main magnetization direction is performed about the rotor axis by an individual correction angle in the angular range of >45° to <135°, preferably of 60° to 120°, more preferably of 75° to 105°.

Advantageously, the commutator brushes can according to one embodiment be pressed against the commutator by use of a spring device. A substantially uniform contact force can thereby be obtained with a simple configuration so that a measured contact pressure is to be expected which keeps the friction between the elements involved within reasonable limits. Also the wear of the commutator brushes is compensated automatically by their tracking.

Graphite brushes or noble metal brushes can there preferably be used. Graphite brushes, which usually have a copper portion, are either radially displaceably mounted or pivotably arranged and have a kind of hook or angular shape. Noble metal brushes are generally leaf springs made of copper with a silver coating in the contact area.

The commutator segments preferably form a cylindrical commutator, where the commutator brushes press diametrically onto the cylindrical jacket surface of the commutator. This type of commutator has proven itself and, depending on the number of commutator segments, enables relatively small commutator diameters, whereby the relative speed between the friction partners can also be kept low.

Furthermore, the invention relates to a rotor for a two-pole brush-commutated DC electric motor according to one of claims 1 to 14. The rotor comprises a hollow-cylindrical ironless winding having n coil segments and a commutator having n commutator segments, each coil segment being electrically connected to two adjacent commutator segments, an axis of gravity that intersects the rotor axis perpendicularly and passes through the center of gravity of a coil segment, or a center line of the coil segment that passes through the center of gravity, and the rotor axis spanning a coil plane that defines the angular position of the associated coil segment, two brush contact surfaces of the commutator segments that are electrically connected to this coil segment have a distance to each other with a distance bisector intersecting the rotor axis perpendicularly, the distance bisector and the rotor axis spanning a commutator plane which defines the angular position of the associated commutator segments, and where n is a whole natural number, and where the coil plane is arranged rotated by a correction angle ($\alpha$) in the angular range of >45° to <135° about the rotor axis relative to the commutator plane of the associated coil segment. Such a rotor could also be used as an exchange rotor for existing motors, provided the angular position of the brush arrangement can likewise be corrected.

Embodiments of the present invention are explained in more detail below with reference to drawings, where.

Figure 1:
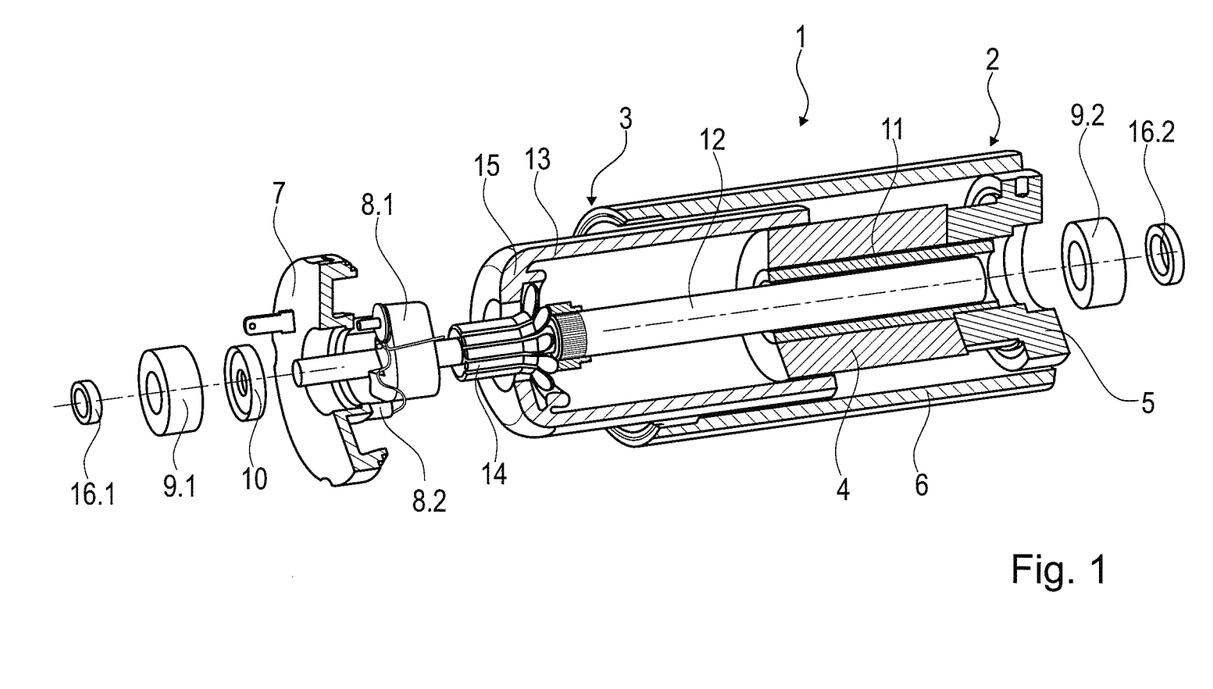
FIG. 1 shows a schematic exploded view of a conventional two-pole brush-commutated DC electric motor.

The configuration of a conventional two-pole brush-commutated DC electric motor 1 shall now be explained in more detail with reference to FIG. 1. The essential components of an ironless DC electric motor 1 are the stator 2 and the rotor 3. Stator 2 comprises as essential components a hollow-cylindrical permanent magnet 4, a flange 5 that positions permanent magnet 4, a magnetic yoke 6 being made of iron and formed as a sleeve, and a front flange 7 on which the two commutator brushes 8.1 and 8.2 are pivotally mounted. Further components of stator 2 are ball bearings 9.1 and 9.2 arranged in flanges 5 and 7 and seal 10.

Rotor 3 comprises as essential components a shaft 12, a self-supporting hollow-cylindrical ironless winding 13, a commutator 14 composed of several commutator segments 14.1-14.13 (in the present case 13) and a commutator plate 15 connecting commutator 14 and winding 13 to shaft 12. Further components of rotor 3 are commutator vee rings 16.1 and 16.2 which serve as a lock and are pressed onto the outer ends of shaft 12. Positioning permanent magnet 4 relative to flange 5 is effected by way of a sleeve 11 pressed into these two elements. It can also be seen from FIG. 1 that commutator segments 14.1-14.13 are bent to an L-shape, together form cylindrical commutator 14 in the front region, while the other L-legs protrude radially outwardly and are electrically connected to the individual coil segments (13 coil segments). It is further to be seen that self-supporting winding 13 in the assembled state rotates in the air gap between the jacket surface of permanent magnet 4 and the inner surface of yoke 6.

Figure 2:
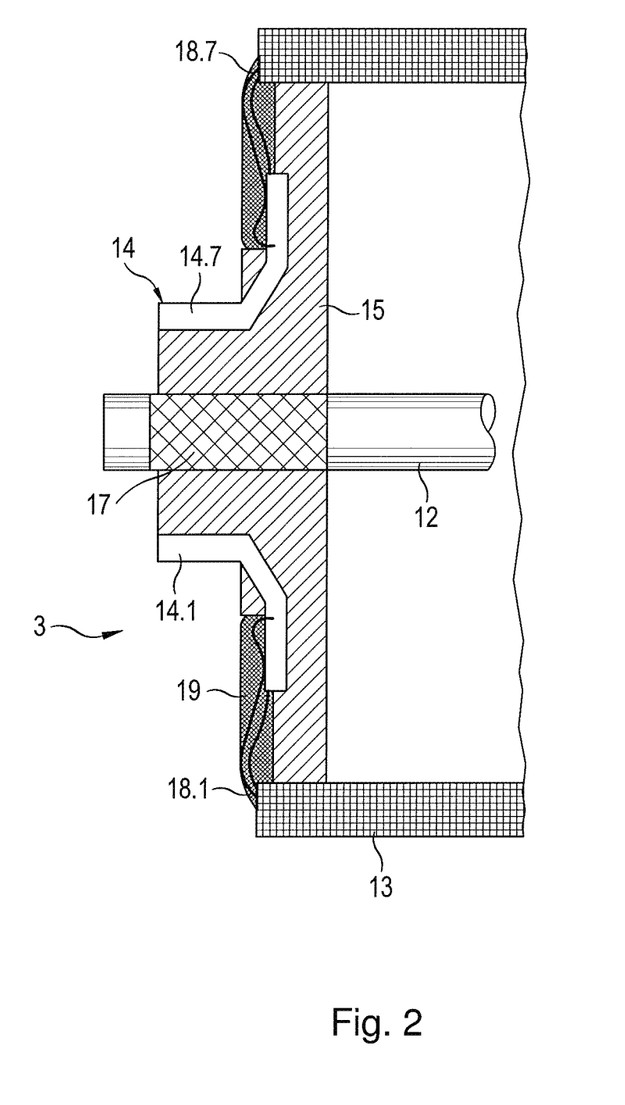
FIG. 2 shows a schematic cross-sectional view of a commutator side of a conventional rotor for a two-pole brush-commutated DC electric motor.

FIG. 2 by way of example shows an alternative configuration of the commutator end of rotor 3.

Commutator segment 15 is produced by way of injection-molding and combines the individual commutator segments 14.1-14.13 so that an insulating layer or a space between them is respectively present. Shaft 12 is in this region provided with a knurl 17 for better adhesion of commutator segment 15. Winding taps 18.1 to 18.13 emerge at the face sides of hollow-cylindrical winding 13. They are in the present case formed by a component of the winding wire which emerges at this point and is led radially inwardly and connected to the radial leg of the associated commutator segment 14.1-14.13. In addition, cover material 19 is provided protecting this connection.

The above description pertains to a two-pole brush-commutated DC electric motor 1 in which winding taps 18.1 to 18.13 are located radially directly outside the associated legs of commutator segments 14.1-14.13. The orientation of commutator brushes 8.1 and 8.2 is such that they contact commutator 14 precisely in the direction of the main magnetization axis of permanent magnet 4. Commutator brushes 8.1 and 8.2 are in the present case arranged by way of pivotably arranged graphite brushes (with copper content) which are pressed on by way of leg springs.

Suitable winding types are windings as described in publications DE 1538843 A1, DE 102005061059 A1, EP 2180581 A2, and DE 102014102204 A1. The required number of coil segments of 13 must of course be present.

However, the number of coil segments and commutator segments is presently not of relevance. As a rule however, an odd number, e.g. 5 or 7, is used.

Figure 3:
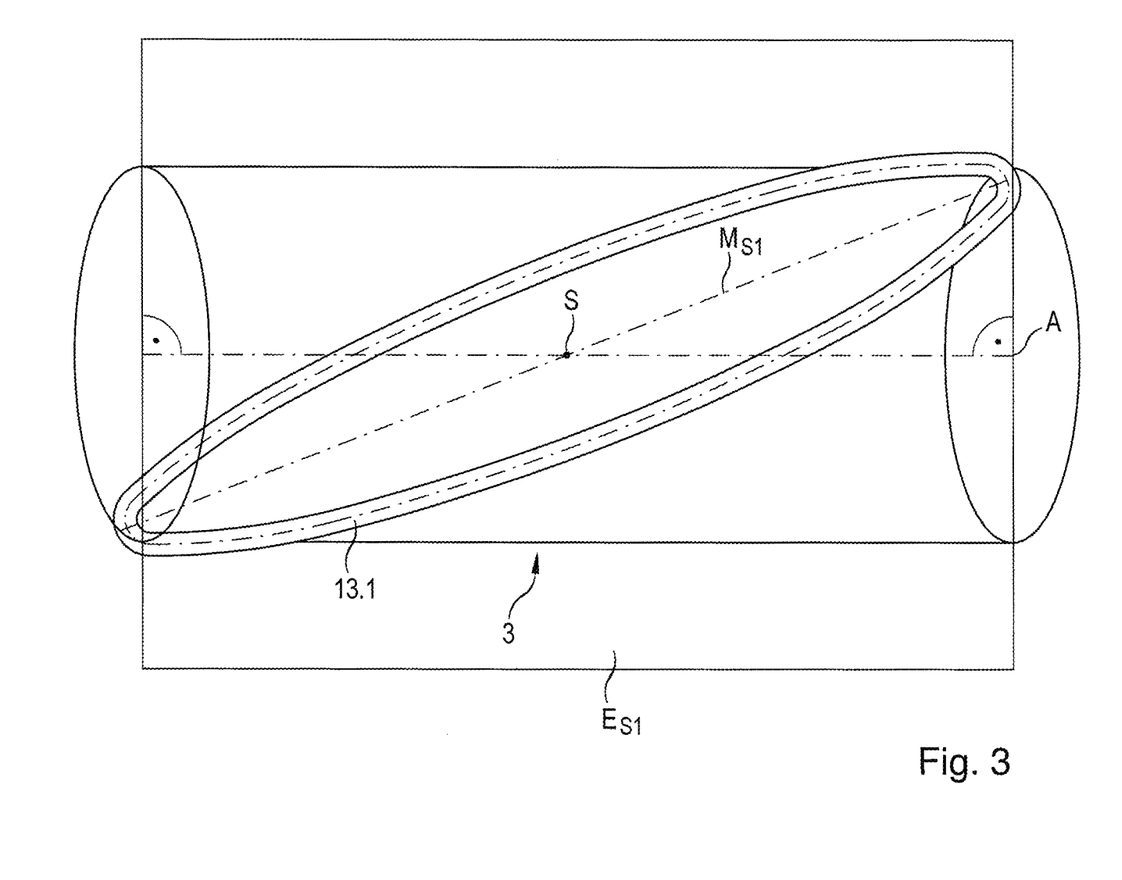
FIG. 3 shows a schematic representation of a winding variant of the rotor.
Figure 4:
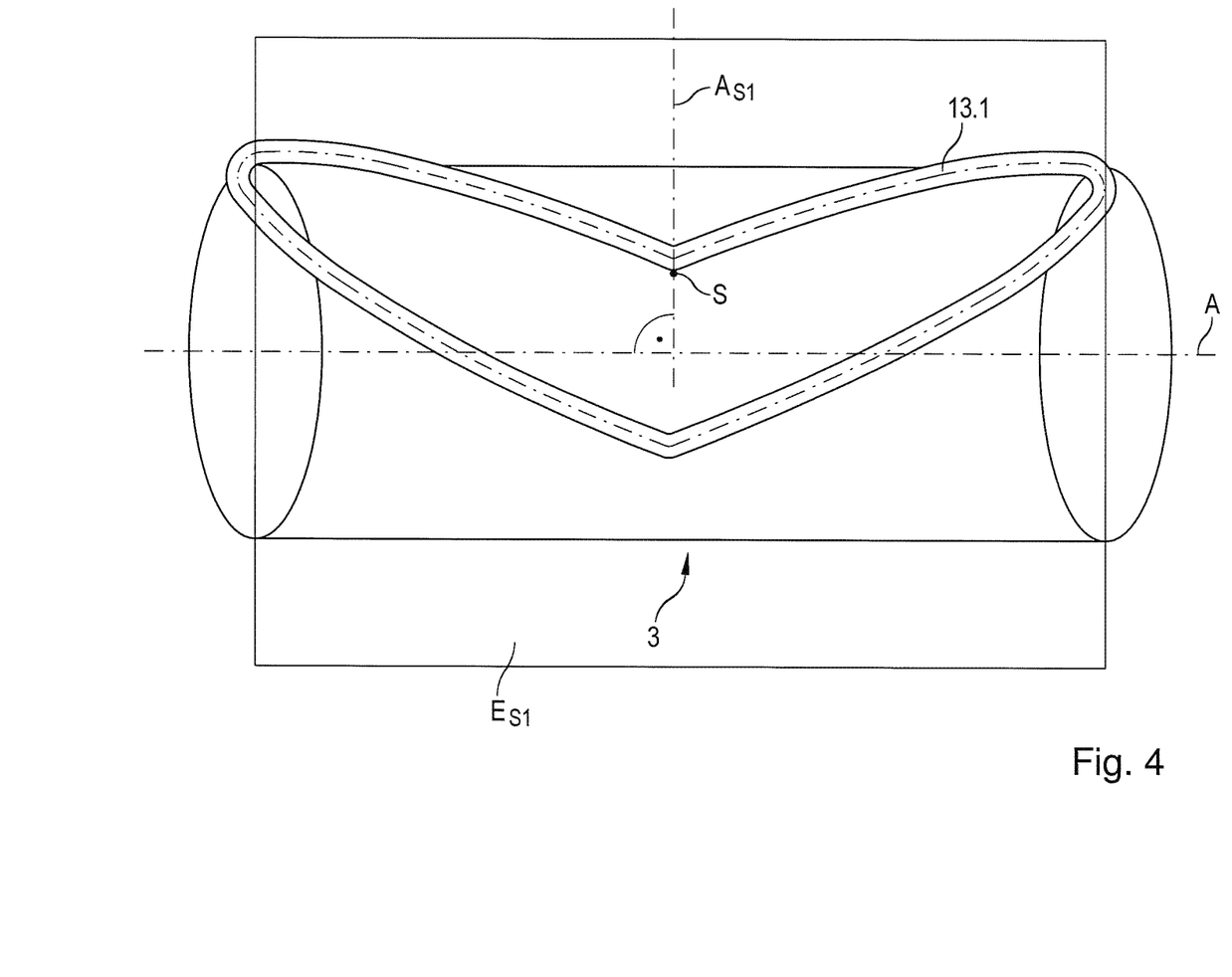
FIG. 4 shows a schematic representation of a further winding variant of the rotor.

Various positioning options and shapes of coil segments shall now be shown by way of example with reference to FIGS. 3 and 4.

FIG. 3 shows a coil segment 13.1 which extends obliquely about the entire hollow-cylindrical winding 13. Coil segment 13.1 consists of several turns and from the top view has an elliptical shape and extends from one face side to the other of sleeve-shaped winding 13. Coil segment 13.1 is therefore in sections located above rotor axis A and in part below rotor axis A. In order to determine the angular position of this coil segment 13.1, its center of gravity S is determined. In this particular case, the center of gravity S is located precisely on rotor axis A, for which reason fixing an axis of gravity perpendicular to rotor axis A is difficult. In such a case, it is possible to work around in that a center line $M_{S1}$ running through the center of gravity is drawn in and divides coil segment 13.1 into two equal halves or determines the longest extension of coil segment 13.1, respectively. This center line $M_{S1}$ together with rotor axis A then spans coil plane $E_{S1}$. Coil plane $E_{S1}$ is therefore disposed perpendicular to rotor axis A. The angular position of coil segment 13.1 on rotor 3 can thereby be precisely defined by positioning this coil plane $E_{S1}$. The procedure is then the same for all other coil segments 13.2-13.7 and the associated coil plane $E_{S2}$-$E_{S7}$ is determined.

For types of windings, as shown in FIG. 4, this is somewhat simpler. The center of gravity S is there not located on rotor axis A. Coil segment 13.1 has a bend or reversal point at the center so that it is positioned substantially on one side relative to rotor axis A and comprises two oblique partial regions. The axis of gravity $A_S$ runs exactly through the center of gravity S and is perpendicular to rotor axis A. Axis of gravity $A_{S1}$ and rotor axis A now span a coil plane $E_{S1}$ which specifies the angular position of coil segment 13.1 on rotor 3. If e.g. coil segment 13.1 defines the angle of 0°, then the other coil segments 13.2-13.7 are distributed accordingly in the predetermined angular steps for the available 360°. The type of winding shown in FIG. 4 is one of the most common. The procedure is then the same for all other coil segments 13.2-13.7 and the associated coil plane $E_{S2}$-$E_{S7}$ is determined.

Figure 5:
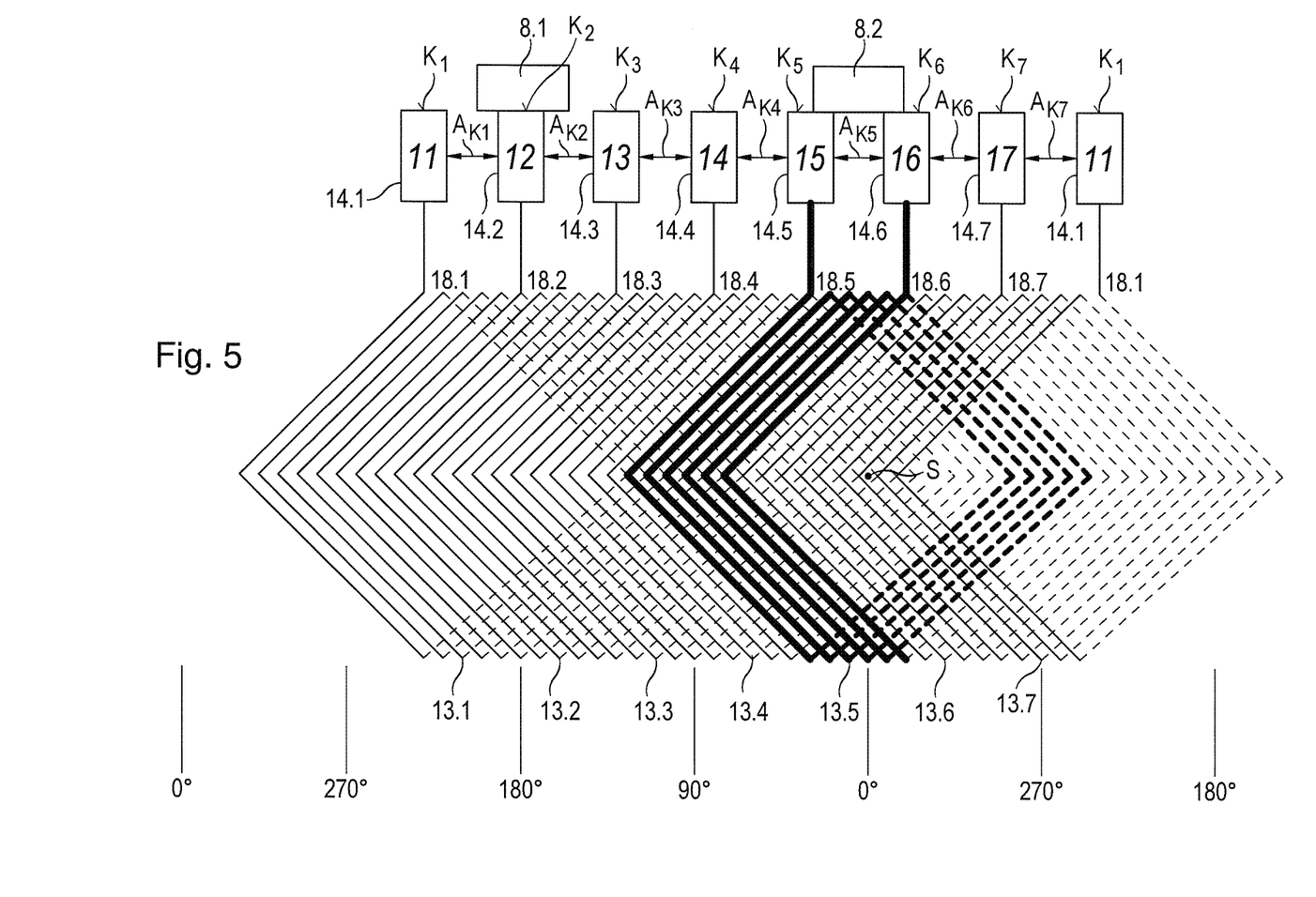
FIG. 5 shows a schematic representation of a developed winding and the associated commutator with brushes of a conventional two-pole brush-commutated DC electric motor.

The arrangement situation among the seven coil segments 13.1-13.7 in a winding form similar to FIG. 4 and the associated commutator 14 with seven commutator segments 14.1-14.7 shall now be explained in more detail with reference to FIG. 5. Shown schematically is the development of an ironless winding 13 with seven winding taps 18.1 to 18.7 and the seven coil segments 13.1 to 13.7. The arrangement shall be explained by way of example using coil segment 13.5 (shown in bold). In the schematic representation, coil segment 13.5 comprises five turns. Respectively disposed on the first and on the last turn is a winding tap 18.5 and 18.6, where winding tap 18.6 simultaneously represents the winding tap of the first turn of coil segment 13.6. Winding tap 18.5 in a similar manner represents the winding tap of the last turn of coil segment 13.4. Winding tap 18.5 is electrically connected to commutator segment 14.5. Winding tap 18.6 is in the same manner electrically connected to commutator segment 14.6. The angle indication in FIG. 5 shows that coil segment 13.5 is arranged exactly centrally to the angle 0°. Brush contact surfaces $K_5$ and $K_6$ of commutator segments 14.5 and 14.6 have a spacing $A_{K5}$. Formed exactly in the center of spacing $A_{K5}$ is a distance bisector $H_{A5}$ (a straight line) which intersects rotor axis A perpendicularly (the distance bisector is disposed perpendicular to the drawing plane of FIG. 5). Rotor axis A and distance bisector $H_{A5}$ then span a plane $E_{K5}$ which precisely defines the angular position of the two commutator segments 14.5 and 14.6. This plane $E_{K5}$ extends exactly centrally between the two commutator segments 14.5 and 14.6, which in the present case is exactly at 0° and therefore corresponds to the same angle as in coil plane $E_{S5}$ of coil segment 13.5. The lines from winding taps 18.5 and 18.6 must thereby also only be led radially inwardly to associated commutator segments 14.5 and 14.6. With such an arrangement, coil planes $E_{S1}$-$E_{S7}$ are therefore identical to associated commutator segments $E_{K1}$-$E_{K7}$.

FIG. 5 also shows the corresponding position of the two commutator brushes 8.1 and 8.2. Commutator brush 18.2 is in exactly symmetrical contact with the two commutator segments 14.5 and 14.6, i.e. symmetrical to the associated brush contact surfaces $K_5$ and $K_6$ of commutator segments 14.5 and 14.6. Coil segment 13.5 between commutator segments 14.5 and 14.6 is short-circuited by brush 8.2. The currents in this coil segment 13.5 generate a force that is located exactly in the plane of brushes 8.1 and 8.2. Brush 8.1 is also affected thereby because it is disposed exactly diametrically opposite (at 180°). This force therefore counteracts the contact pressure on commutator brushes 8.1 and 8.2 and therefore leads to modulation of the current. Due to this feedback, increased vibrations can occur. It should additionally be noted that winding tap 18.2 and commutator segment 14.1 are shown twice in the illustration. In the cylindrically rolled shape of winding 13 they coincide, i.e. this is in reality the same winding tap 18.1 and commutator segment 14.1, respectively.

The excitation field of stator 2 points in the direction denoted by 0°. This means that the main magnetization direction (perpendicular to the drawing plane) of permanent magnet 4 is accordingly perpendicular to rotor axis A. Commutator brushes 8.1 and 8.2 are accordingly aligned in the plane spanned by rotor axis A and the main magnetization direction.

Figure 6:
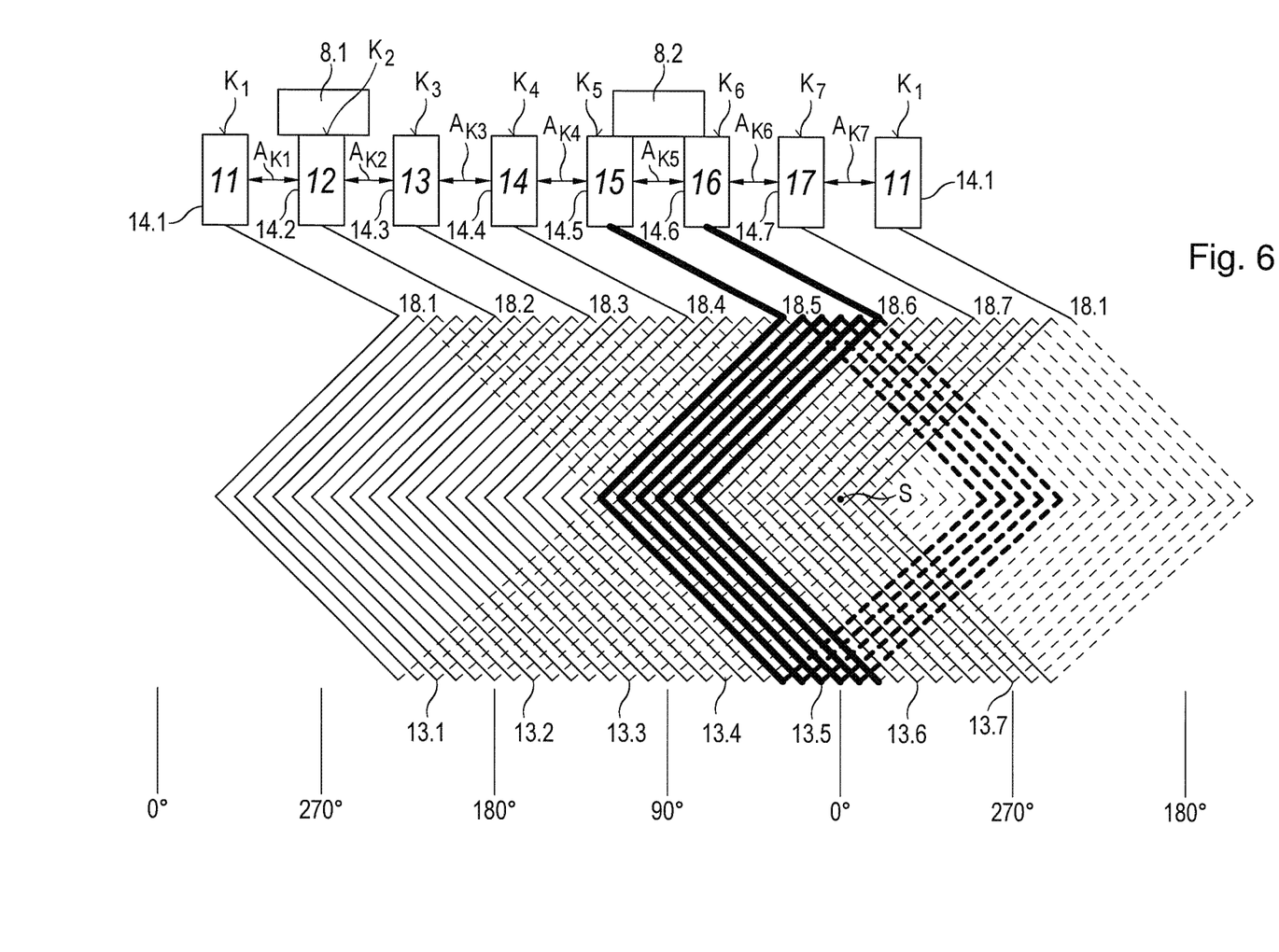
FIG. 6 shows a schematic representation of a developed winding and the associated commutator with brushes of a two-pole brush-commutated DC electric motor according to the invention.

The arrangement shown in FIG. 5 is one of the most common arrangements in the field of two-pole brush-commutated DC electric motors. This is where the invention is intended to provide a remedy which shall now be explained with reference to schematic FIG. 6. Insofar as reference is made to components that are identical and of equal effect, reference is additionally made to the preceding description using the same reference numerals. The invention can make use of the principles and structures described with reference to FIGS. 1 to 4, except for the differences described below Coil segments 13.1-13.7 are again arranged exactly in the same angular position. Also the excitation field of stator 2 points in the direction denoted by 0°, i.e. the main magnetization direction of permanent magnet 4 is aligned accordingly perpendicular to rotor axis A. However, an offset of the angle of rotation of commutator 14 and commutator brushes 8.1 and 8.2 now arises. In the embodiment shown, the correction angle α, by which the rotation relative to winding 13 is effected, is 90° (is therefore in the preferred range of >45° and <135°. This means that commutator brush 8.2 is in this system located at 90° and coil segment 13.5 at this point in time being short-circuited is at 0°. The two associated commutator segments 14.5 and 14.6 are in a centered manner respectively aligned to the angle of rotation of 90°. The same also applies to commutator brush 8.1, which is in this system now at 270°. Due to the rotation of the entire commutator 14, including associated commutator brushes 8.1 and 8.2, by the correction angle α, starting out from winding taps 18.1 to 18.7, electrical connections disposed therebetween must also bridge this angle. Various options for this are possible for this specific configuration. The conductors disposed therebetween can consist of the winding wire, be a part of the commutator itself, or be formed by separate elements, e.g. a PCB circuit.

The rotation by the correction angle results in a force exiting from the short-circulated coil segment 13.5 being perpendicular to the drawing plane (FIG. 6) now not acting in the pressing direction of brushes 8.1 and 8.2 but perpendicular thereto and is therefore perceived only as a tangential force during the commutation. The influence on the brush contact by a possible deflection of rotor 3 due to these force ratios is thereby very greatly reduced, as a result of which current modulations are also reduced or suppressed, respectively. In the arrangement shown in FIG. 6, coil planes $E_{S1}$-$E_{S7}$ are arranged rotated about rotor axis A by 90° relative to commutator planes $E_{K1}$-$E_{K7}$, respectively.

Figure 7:
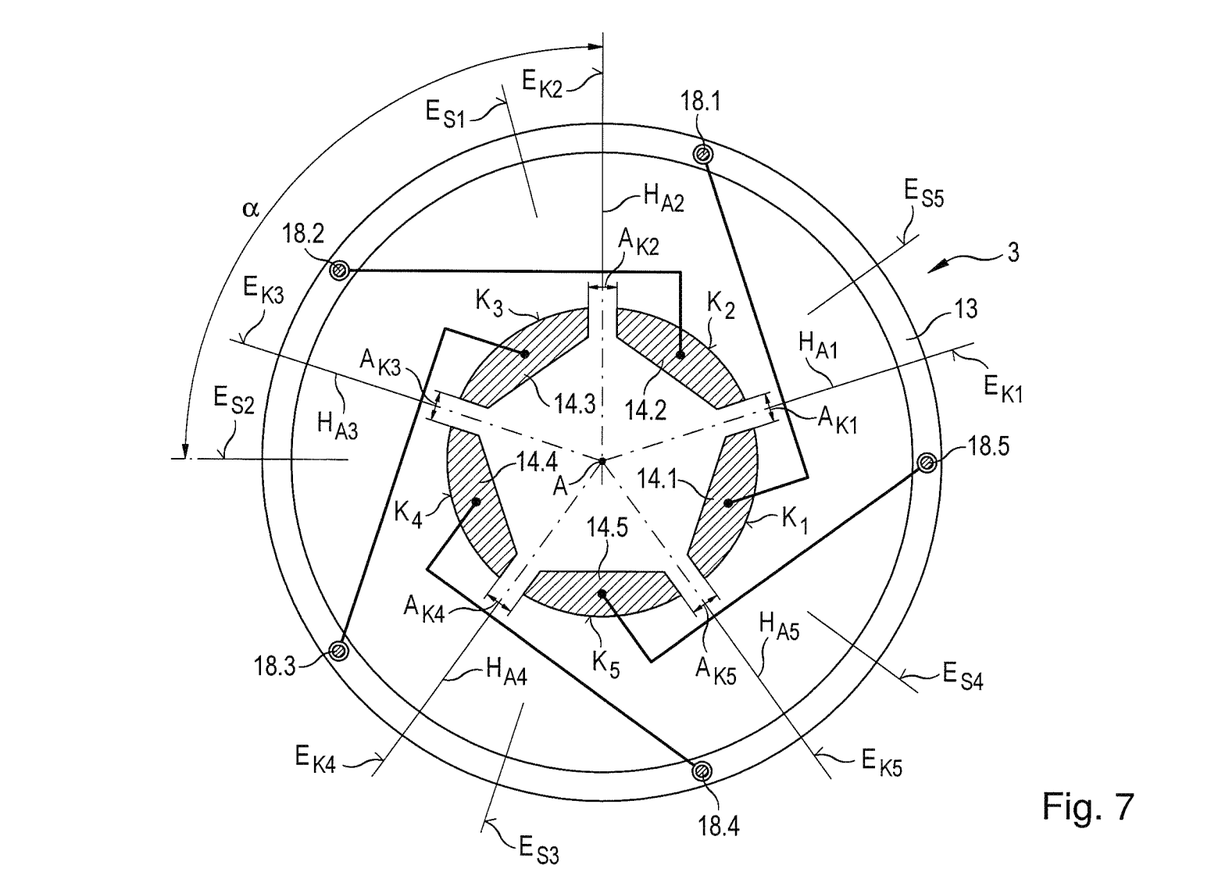
FIG. 7 shows a schematic front view of the commutator side of a variant of a rotor according to the invention.

This rotation is again explained in more detail with reference to FIG. 7 using a front view of rotor 3. The embodiment shown in FIG. 7 comprises only five coil segments 13.1-13.5 and five commutator segments 14.1-14.5. Winding taps 18.1-18.5 on the face side of winding sleeve 13 are also shown. It can be seen that the winding wires are led out obliquely and then connected to the associated commutator segment 14.1-14.5. Commutator segment 14.2 is presently mentioned by way of example, which is electrically in contact with tapping 18.2. The drawing also shows that commutator plane $E_{K2}$ is arranged rotated by a correction angle α of 90° relative to coil plane $E_{S2}$. The same applies to the other commutator planes $E_{K1}$, $E_{K3}$-$E_{K5}$ and the respectively associated coil planes $E_{S1}$, $E_{S2}$-$E_{S5}$.

LIST OF REFERENCE NUMERALS

1 DC electric motor
2 stator
3 rotor
4 permanent magnet
5 flange
6 yoke
7 front flange
8.1, 8.2 commutator brushes
9.1.9.2 ball bearing
10 seal
11 shaft
12 shaft
13 winding 13.1-13.13 coil segments
14 commutator
14.1-14.13 commutator segments
15 commutator plate
16.1, 16.2 commutator vee ring
17 knurl
18.1-18.13 winding tap
19 cover material
A rotor axis
$A_{K1}$-$A_{K7}$ spacing commutator segments
$E_{K1}$-$E_{K5}$ commutator plane
$E_{S1}$-$E_{S7}$ coil plane
$H_{A1}$-$H_{A7}$ distance bisector
$K_1$-$K_7$ brush contact surface
$M_{S1}$-$M_{S7}$ center line coil segment
S center of gravity
α correction angle

The invention claimed is:

1. Two-pole brush-commutated DC electric motor with a stator and a rotor provided with a hollow-cylindrical ironless winding having n coil segments and with a commutator having n commutator segments, each coil segment being electrically connected to two adjacent commutator segments, an axis of gravity that intersects said rotor axis perpendicularly and passes through the center of gravity of a coil segment or a center line of said coil segment that passes through said center of gravity and said rotor axis spanning a coil plane that defines the angular position of the associated coil segment, two brush contact surfaces of said commutator segments that are electrically connected to said coil segment have a distance to each other with a distance bisector intersecting said rotor axis perpendicularly, said distance bisector and said rotor axis spanning a commutator plane which defines the angular position of the associated commutator segments, and where n is a whole natural number, wherein said coil plane of said coil segment is arranged rotated by a correction angle in the angular range of >45° to <135° about said rotor axis relative to said commutator plane of said associated commutator segments.

2. Two-pole brush-commutated DC electric motor according to claim 1, wherein said correction angle is in an angular range of 60° to 120°, preferably of 75° to 105°.

3. Two-pole brush-commutated DC electric motor according to claim 1, wherein said correction angle is 90°.

4. Two-pole brush-commutated DC electric motor according to claim 1, wherein said individual coil segments of said winding run oblique relative to said rotor axis.

5. Two-pole brush-commutated DC electric motor according to claim 1, wherein the individual turns of said coil segments in an unwound state of said winding each have a rhombic shape, the front and rear tip of which are located on face sides of said winding.

6. Two-pole brush-commutated DC electric motor according to claim 1, wherein a first turn of said coil segment and a last turn of said coil segment are each provided with a winding tap which is electrically connected to a respectively associated commutator segment.

7. Two-pole brush-commutated DC electric motor according to claim 6, wherein said winding taps are disposed at a face side of that winding which is closest to said commutator.

8. Two-pole brush-commutated DC electric motor according to claim 1, wherein said winding taps are led obliquely out from said winding in order to bridge said correction angle.

9. Two-pole brush-commutated DC electric motor according to claim 1, wherein said winding taps and said associated commutator segments are connected by use of a conductor which is formed from the winding wire or which is part of said commutator or which is formed by a PCB circuit.

10. Two-pole brush-commutated DC electric motor according to claim 1, wherein said stator comprises a permanent magnet with a main magnetization direction, and said commutator comprises two diametrically arranged commutator brushes, the common axis of which is oriented to be rotated by said correction angle relative to said main magnetization direction.

11. Two-pole brush-commutated DC electric motor according to claim 1, wherein said commutator brushes are pressed against said commutator by use of a spring device.

12. Two-pole brush-commutated DC electric motor according to claim 1, wherein said commutator brushes are graphite brushes or noble metal brushes.

13. Two-pole brush-commutated DC electric motor according to claim 1, wherein said commutator segments form a cylindrical commutator and said commutator brushes press diametrically onto a cylindrical jacket surface of said commutator.

14. Rotor for a two-pole brush-commutated DC electric motor according to claim 1, wherein said rotor comprises a hollow-cylindrical ironless winding having n coil segments and a commutator having n commutator segments, each coil segment being electrically connected to two adjacent commutator segments, an axis of gravity that intersects said rotor axis perpendicularly and passes through the center of gravity of a coil segment or a center line of said coil segment that passes through said center of gravity and said rotor axis spanning a coil plane that defines the angular position of the associated coil segment, two brush contact surfaces of said commutator segments that are electrically connected to the same coil segment have a distance to each other with a distance bisector intersecting said rotor axis perpendicularly, said distance bisector and said rotor axis spanning a commutator plane which defines the angular position of the associated commutator segments, and where n is a whole natural number, wherein said coil plane of said coil segment is arranged rotated by a correction angle in the angular range of >45° to <135° about said rotor axis relative to said commutator plane of said associated commutator segments.

15. Two-pole brush-commutated DC electric motor with a stator and a rotor provided with a hollow-cylindrical ironless winding having n coil segments and with a commutator having n commutator segments, each coil segment being electrically connected to two adjacent commutator segments, an axis of gravity that intersects said rotor axis perpendicularly and passes through the center of gravity of a coil segment or a center line of said coil segment that passes through said center of gravity and said rotor axis spanning a coil plane that defines the angular position of the associated coil segment, two brush contact surfaces of said commutator segments that are electrically connected to said coil segment have a distance to each other with a distance bisector intersecting said rotor axis perpendicularly, said distance bisector and said rotor axis spanning a commutator plane which defines the angular position of the associated commutator segments, and where n is a whole natural number, wherein said coil plane of said coil segment is arranged rotated by a correction angle in the angular range of >45° to <135° about said rotor axis relative to said commutator plane of said associated commutator segments,
  wherein said stator comprises a permanent magnet with a main magnetization direction, and said commutator comprises two diametrically arranged commutator brushes, the common axis of which is oriented to be rotated by said correction angle relative to said main magnetization direction.

\* \* \* \* \*